(12) United States Patent
Nadd

(10) Patent No.: US 6,587,027 B1
(45) Date of Patent: Jul. 1, 2003

(54) SOLID STATE FUSE

(75) Inventor: Bruno C. Nadd, Lourmarin (FR)

(73) Assignee: International Rectifier Corporation, El Segundo, CA (US)

( * ) Notice: Subject to any disclaimer, the term of this patent is extended or adjusted under 35 U.S.C. 154(b) by 17 days.

(21) Appl. No.: 10/055,496

(22) Filed: Jan. 23, 2002

(51) Int. Cl.⁷ ...................... H01H 85/044; H01H 85/32; H02H 9/02; H02H 7/20

(52) U.S. Cl. .................. 337/167; 337/206; 337/221; 361/54; 361/93.1; 361/93.7; 361/101

(58) Field of Search .................. 337/167, 158, 337/206, 221, 242, 266; 361/54, 55, 57, 93.1, 93.7, 100, 101; 327/525; 340/638

(56) References Cited

U.S. PATENT DOCUMENTS

| | | | | |
|---|---|---|---|---|
| 3,337,744 A | * | 8/1967 | Johnson | 307/86 |
| 3,413,522 A | * | 11/1968 | Beszedics et al. | 361/58 |
| 3,473,106 A | * | 10/1969 | Grabl | 323/277 |
| 3,531,712 A | * | 9/1970 | Cecchini | 323/224 |
| 3,532,936 A | * | 10/1970 | Kuster | 361/92 |
| 3,697,861 A | * | 10/1972 | Frazier | 323/277 |
| 4,016,460 A | * | 4/1977 | Stadler | 330/207 P |
| 4,459,537 A | * | 7/1984 | McWhorter | 323/224 |
| 4,618,812 A | * | 10/1986 | Kawakami | 323/224 |
| 4,752,852 A | * | 6/1988 | Ahl et al. | 361/58 |
| 4,835,649 A | * | 5/1989 | Salerno | 361/18 |
| 5,136,452 A | * | 8/1992 | Orton | 361/33 |
| 5,233,287 A | * | 8/1993 | Lenk | 323/268 |
| 5,381,296 A | * | 1/1995 | Ekelund et al. | 361/106 |
| 5,506,493 A | * | 4/1996 | Stengel | 323/223 |
| 5,539,603 A | * | 7/1996 | Bingham | 361/56 |
| 5,539,610 A | * | 7/1996 | Williams et al. | 361/246 |
| 5,642,251 A | * | 6/1997 | Lebbolo et al. | 361/84 |
| 5,814,979 A | * | 9/1998 | Grimm | 323/284 |
| 5,815,356 A | * | 9/1998 | Rodriguez et al. | 361/91.6 |
| 5,946,270 A | * | 8/1999 | Jang | 367/18 |
| 6,118,641 A | * | 9/2000 | Atkins et al. | 361/58 |
| 2002/0080544 A1 | * | 6/2002 | Pellegrino | 361/93.9 |

FOREIGN PATENT DOCUMENTS

| | | | | |
|---|---|---|---|---|
| DE | 3705177 A1 | * | 6/1987 | ............ H02H/3/08 |
| DE | 3835662 A1 | * | 4/1990 | ............ B60R/16/02 |
| DE | 3906955 C1 | * | 7/1990 | ............ H02H/7/20 |

* cited by examiner

Primary Examiner—Anatoly Vortman
(74) Attorney, Agent, or Firm—Ostrolenk, Faber, Gerb & Soffen, LLP

(57) ABSTRACT

A solid state fuse type protective circuit is provided in which a series MOSFET is connected in series with the load and its voltage source and a shunt MOSFET is connected in parallel with the load. A control circuit turns the series MOSFET on and the shunt FET off under normal operation; and turns the series FET off and applies a turn on signal to the shunt FET under a fault condition. An indicator LED is connected across the series FET and turns on when the series FET turns off.

12 Claims, 1 Drawing Sheet

SOLID STATE FUSE

FIELD OF THE INVENTION

This invention relates to electrical fuses and more specifically relates to a resettable fuse implemented by solid state MOSFETs.

BACKGROUND OF THE INVENTION

Electrical fuses, for example, those for automotive use, are metal fusible links which carry the current in the circuit being protected. These fuse links melt or vaporize at a given current level to open the circuit being protected. They usefully provide an open gap in the circuit to protect personnel who work on the circuit from voltages which might otherwise appear across the open circuited load. The fuses must be replaced after their operation. Circuit breakers may also be used to protect electrical circuits, but they are large and expensive.

Solid state fuses are also known in which transistors and thyristors are placed in series with the load and turn off in response to a load fault condition. These devices however, do not provide the sure protection of the open gap of a fuse or contact air gap of a circuit breaker.

It would be desirable to provide a solid state fuse, that is, one employing solid state controllably conductive devices such as, MOSFETs, IGBTs, thyrsitors and the like which would also provide certainty that an apparently opened circuit load can be worked on without requiring an added air gap type device.

BRIEF DESCRIPTION OF THE INVENTION

In accordance with the invention, a load is protected by a pair of controllably conductive devices, one in series with the load and the other in parallel with the load. The series device is normally conductive and is turned of in response to a predetermined fault condition. The parallel device is normally off, but can be turned on, with a short delay after the turn off of the series device, in response to a fault if a potential appears across the load. Thus, after a fault and the "opening" of the fuse, a positive short is applied across the load to permit the safe maintenance of the load.

In a preferred embodiment of the invention the series and shunt devices are implemented as power MOSFETs. The shunt device may be a normally conductive depletion type MOSFET which is turned off by the application of a gate signal for normal operation. An LED indicator may be connected across the series device to indicate the turn off of the device, and thus the operation of the "fuse" or the opening of this circuit.

An IC control may be provided along with a current sense circuit to provide signals to turn off the series device in response to the fault, and to turn on the shunt device, (or enable it for conduction if a voltage is applied across the load after turn off of the series device) preferably with a short time delay after the turn off of the series device.

DETAILED DESCRIPTION OF THE PREFERRED EMBODIMENT

Figure 1:
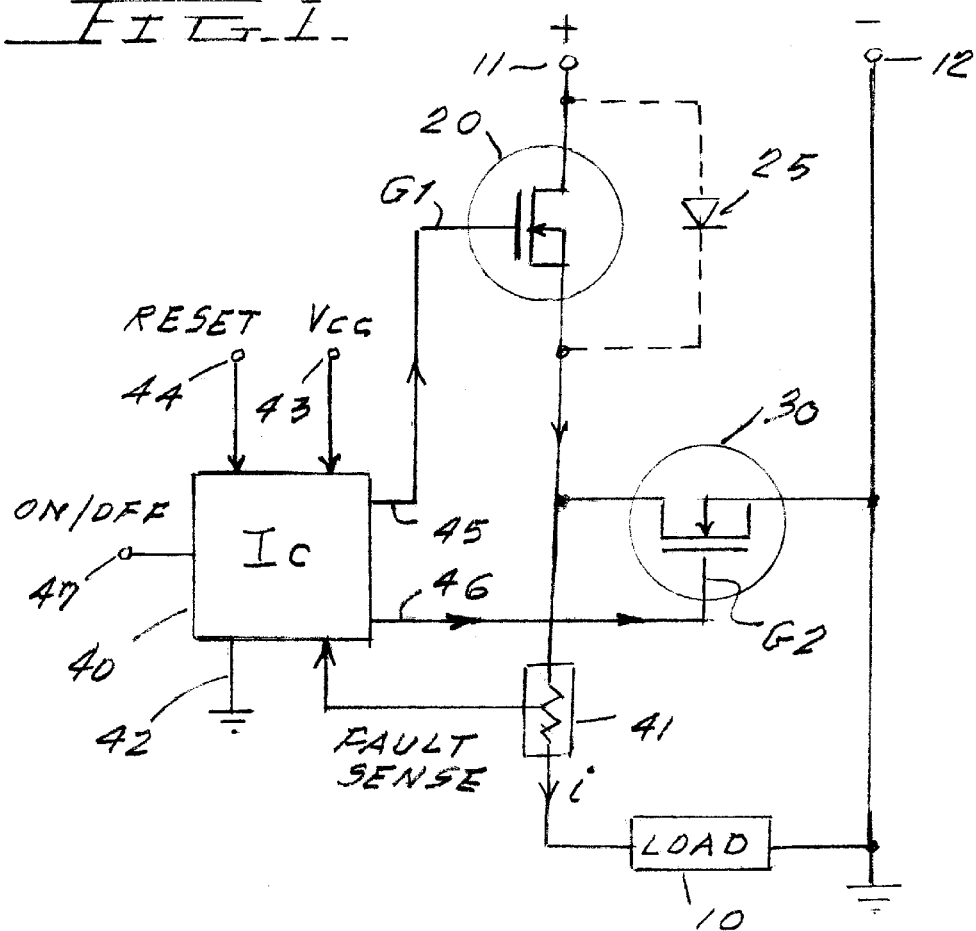
FIG. 1 is a circuit diagram of a preferred embodiment of the invention.

Referring to FIG. 1, the circuit shown is a fuse for a load 10 which is energized from a voltage source at terminals 1 and 12. Load 10 may be any electrical load such as an automotive lamp or motor load and terminals 11 and 12 may be the terminals of an a-c or d-c source. Typically terminals 11 and 12 may be the d-c terminals of an automotive power source.

A controllably conductive device 20 has its main power terminals in series with load 10. Device 20 is shown as an N channel enhancement type power MOSFET having gate $G_1$ which controls the turn on and turn off of MOSFET 20 in the well known manner.

A conduction condition indicator, for example, an LED indicator lamp 25 may be connected across MOSFET 20, to turn on when MOSFET 20 is turned off.

A second controllably conductive device 30, termed a shunt device, is connected across load 10 and is also shown as an N channel enhancement mode MOSFET having a gate $G_2$ which controls its turn on and turn off. Device 30 can also be a normally on depletion device.

A control IC circuit 40 is provided along with a fault sense device 41 to control the turn on and turn off of devices 20 and 30 in response to given fault conditions.

If current faults only are to be protected against, fault sense device 41 can be a simple resistor which produces an output voltage related to the load current i. The current sense device may be connected directly to the source of series MOSFET 20 and in "front" of shunt MOSFET 30 if desired. Further, sense circuit 41 can be an intelligent current sense device (such as an IPS device available from the International Rectifier Corporation) which is capable of more sophisticated current sensing than a simple resistor. Further, the current sense device can be integrated into MOSFET 20, if desired.

The IC 40 is a conventional ASIC which has an input from fault sensor 41 as shown. IC 40 also has ground terminal 42, a $V_{cc}$ voltage input terminal 43 and reset terminal 44 operable by the depression of a manual or other control switch circuit. The IC then produces outputs at terminals 45 and 46 to gates $G_1$ and $G_2$. An ON/OFF switch terminal 47 may also be provided to turn MOSFET 20 on and off (manually) without turning on shunt MOSFET 30, if desired.

Figure 2:
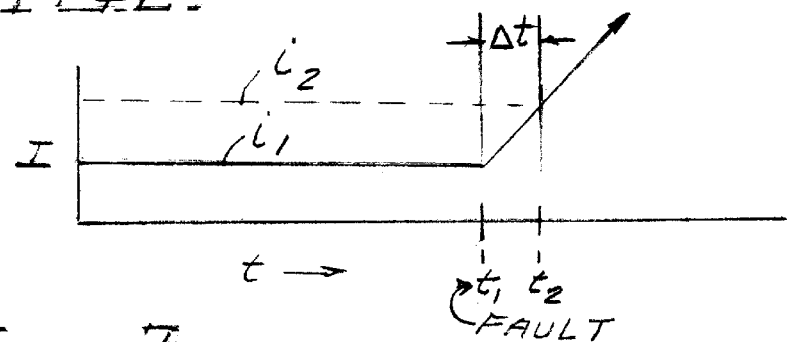
FIG. 2 is a diagram of load current versus time for the circuit of FIG. 1.
Figure 3:
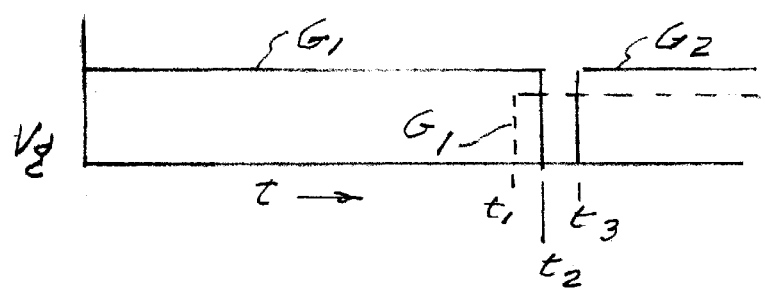
FIG. 3 is a diagram of the gate voltages of the series and shunt devices of FIG. 1 as a function of time.

The operation of the circuit of FIG. 1 is next described with the assistance of FIGS. 2 and 3. Under ordinary operation, load 10 may draw a d-c current $i_1$, shown in FIG. 2. The output to $G_1$ is high during this period (as well as for any current less than $i_1$, as monitored by sensor 41) so that series MOSFET 20 is on. At the same time, the output to shunt MOSFET 30 is low and the MOSFET 30 is off.

If now a fault occurs at time $t_1$ in FIGS. 2 and 3, the current i increases as shown. If the current reaches a predetermined value $i_2$ the IC 40 turns off the gate signal to gate $G_1$ at time $t_2$ and $G_1$ goes low, thereby turning MOSFET 20 off and turning off the fault current to load 10. The IC may also be adapted to turn off the MOSFET 20 if a current greater than $i_1$ flows for a longer time $\Delta t$ selected by the designer or user.

After a short delay as shown in FIG. 3 and at time $t_3$ the IC output to gate $G_2$ goes high to turn on MOSFET 30 (if a fault voltage continues to be pursuant across the load and thus its source and drain terminals) and place a conductive shunt path across load 10. Thus, if a voltage exists across load 10 it will be short circuited, protecting personal working on the load.

Note that MOSFET 30 may be a normally conductive depletion its gate $G_2$ is normally high, to turn the device off, and goes low at time $t_3$ to turn the device on.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. A solid state fuse for an electrical load powered from a voltage source and comprising: a series controllably conductive device connected in series with said voltage source and load and having a control electrode energizable to turn said series device on or off; a shunt controllably conductive device connected across said load and having a control electrode energizable to turn said shunt device on or off; a control circuit connected to said control electrodes of said series and shunt devices and a fault sensor coupled between said load and said control circuit and producing an output signal to said control circuit in response to a fault condition in said load; said control circuit producing control output signals to turn said series device off and said shunt device on in response to a predetermined fault condition.

2. The fuse of claim 1, which further includes a reset control circuit for resetting said IC to turn on said series device and to turn off said shunt device after the clearing of the fault condition.

3. The fuse of claim 1, wherein said series and shunt devices are power MOSFETs.

4. The fuse of claim 3, wherein at least one of said series and shunt devices are enhancement type MOSFETs.

5. The fuse of claim 3, which further includes a reset control circuit for resetting said IC to turn on said series device and to turn off said shunt device after the clearing of the fault condition.

6. The fuse of claim 4, which further includes a reset control circuit for resetting said IC to turn on said series device and to turn off said shunt device after the clearing of the fault condition.

7. The fuse of claim 1, which further includes an conduction condition indicator connected across said series device.

8. The fuse of claim 7, which further includes a reset control circuit for resetting said IC to turn on said series device and to turn off said shunt device after the clearing of the fault condition.

9. The fuse of claim 8, wherein said series and shunt devices are power MOSFETs.

10. The fuse of claim 9, wherein at least one of said series and shunt devices is a depletion type MOSFET.

11. The method of protecting an electrical load against fault conditions comprising: the opening of a normally conductive first MOSFET device in series between the load and an energizing circuit therefor in response to a fault condition, and enabling the closing of a normally off second MOSFET which is in parallel with the load in response to the appearance of a voltage across the load after the first MOSFET opens, thereby to permit the safe examination and correction of said fault.

12. The method of claim 1, which further includes the step of turning said first MOSFET on and said second MOSFET off after the repair of said fault condition.

* * * * *